(12) United States Patent
Biswas et al.

(10) Patent No.: US 7,480,497 B2
(45) Date of Patent: Jan. 20, 2009

(54) MULTICARRIER RECEIVER AND METHOD FOR CARRIER FREQUENCY OFFSET CORRECTION AND CHANNEL ESTIMATION FOR RECEIPT OF SIMULTANEOUS TRANSMISSIONS OVER A MULTI-USER UPLINK

(75) Inventors: Ashim Biswas, Karnataka (IN); Lakshmipathi Sondur, Karnataka (IN); Anees A. Sahib, Karnataka (IN); Sean Lawrence, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 591 days.

(21) Appl. No.: 11/171,643

(22) Filed: Jun. 29, 2005

(65) Prior Publication Data

US 2007/0004337 A1   Jan. 4, 2007

(51) Int. Cl.
*H04B 1/18* (2006.01)

(52) U.S. Cl. .................... 455/168.1; 370/343; 375/231; 375/148

(58) Field of Classification Search ................ 455/132, 455/133, 134, 135, 140, 168.1; 370/332, 370/238, 449, 343; 375/148, 231, 348
See application file for complete search history.

(56) References Cited

U.S. PATENT DOCUMENTS

| | | | |
|---|---|---|---|
| 5,274,841 A | 12/1993 | Natarajan et al. | |
| 5,818,872 A * | 10/1998 | Gupta | 375/222 |
| 5,896,561 A | 4/1999 | Schrader et al. | |
| 6,229,799 B1 | 5/2001 | Caillerie et al. | |
| 6,504,834 B1 | 1/2003 | Fifield | |
| 6,847,313 B2 | 1/2005 | Biswas | |
| 6,947,505 B2 * | 9/2005 | Learned | 375/346 |
| 7,006,530 B2 | 2/2006 | Spinar et al. | |
| 7,286,617 B2 * | 10/2007 | Vanderperren et al. | 375/343 |
| 7,313,203 B2 * | 12/2007 | Tubbax et al. | 375/316 |
| 7,324,607 B2 | 1/2008 | Guchhait | |
| 7,327,800 B2 * | 2/2008 | Oprea et al. | 375/267 |
| 7,352,819 B2 | 4/2008 | Lakshmipathi | |
| 2002/0181390 A1 * | 12/2002 | Mody et al. | 370/208 |
| 2003/0152022 A1 * | 8/2003 | Hosur | 370/208 |
| 2004/0005010 A1 | 1/2004 | He et al. | |
| 2004/0048584 A1 * | 3/2004 | Vaidyanathan et al. | 455/103 |
| 2005/0058215 A1 | 3/2005 | Biswas | |

(Continued)

FOREIGN PATENT DOCUMENTS

EP   1107620 A2   6/2001

(Continued)

OTHER PUBLICATIONS

"International Search Report for corresponding PCT Application No. PCT/US2006/025777", (Oct. 27, 2006), 5 pgs.

(Continued)

*Primary Examiner*—Edward Urban
*Assistant Examiner*—Christian A Hannon
(74) *Attorney, Agent, or Firm*—Schwegman, Lundberg & Woessner, P.A.; Gregory J. Gorrie

(57) ABSTRACT

Multicarrier receivers and methods for carrier frequency offset correction and channel estimation for receipt of simultaneous transmissions over a multi-user uplink are generally described herein. Other embodiments may be described and claimed.

30 Claims, 6 Drawing Sheets

U.S. PATENT DOCUMENTS

| | | |
|---|---|---|
| 2005/0111427 A1 | 5/2005 | Li et al. |
| 2005/0129101 A1 | 6/2005 | Stephens et al. |
| 2005/0144307 A1 | 6/2005 | Li et al. |
| 2005/0147115 A1 | 7/2005 | Li et al. |
| 2005/0195790 A1* | 9/2005 | Learned et al. ............. 370/342 |
| 2005/0281241 A1* | 12/2005 | Webster et al. ............. 370/343 |
| 2006/0014494 A1* | 1/2006 | Vanderperren et al. ..... 455/63.1 |
| 2006/0045062 A1* | 3/2006 | Gorokhov et al. ........... 370/343 |
| 2006/0045220 A1 | 3/2006 | Biswas |
| 2006/0222095 A1* | 10/2006 | Niu et al ..................... 375/260 |
| 2007/0002749 A1 | 1/2007 | Sondur et al. |
| 2007/0002800 A1 | 1/2007 | Sondur et al. |
| 2007/0004347 A1 | 1/2007 | Sondur |
| 2007/0104221 A1 | 5/2007 | Venkatachalam |
| 2007/0142089 A1* | 6/2007 | Roy ........................ 455/562.1 |
| 2007/0173203 A1 | 7/2007 | Fei et al. |

FOREIGN PATENT DOCUMENTS

| | | |
|---|---|---|
| WO | WO-01/86993 A1 | 11/2001 |
| WO | WO-2005/053235 A1 | 6/2005 |
| WO | WO-2007/002805 A1 | 1/2007 |
| WO | WO-2007/002924 A1 | 1/2007 |

OTHER PUBLICATIONS

Biswas, A., et al., "Channel Estimation Techniques With Long Training Sequence for IEEE 802.11A", *2004 International Conference on Signal Processing & Communications (SPCOM '04)*, (2004), 136-139.

Cui, T., et al., "Robust Joint Frequency Offset and Channel Estimation for OFDM Systems", *IEEE 60th Vehicular Technology Conference (VTC 2004-Fall)*, vol. 1., (2004),603-607.

Egashira, N., et al., "Improvement of CCI Compensation Accuracy Using Feedback Phase Tracking in MIMO-OFDM Systems", *IEEE Global Telecommunications Conference (Globecom '04)*, vol. 2, (2004),923-927.

Frenkiel, R. H., et al., "The Infostations Challenge: Balancing Cost and Ubiquity in Delivering Wireless Data", *IEEE Personal Communications*, vol. 7, (Apr. 2000),66-71.

Moose, P. H., "A Technique for Orthogonal Frequency Division Multiplexing Frequency Offset Correction", *IEEE Transactions on Communications*, 42(10), (Oct. 1994),2908-2914.

Pun, M., et al., "An EM-Based Joint Maximum Likelihood Estimation of Carrier Frequency Offset and Channel for Uplink OFDMA Systems", *IEEE 60th Vehicular Technology Conference (VTC 2004)*, (2004),598-602.

Yu, C.-Y., et al., "Design and Simulation of a MIMO OFDM Baseband Transceiver for High Throughput Wireless LAN", *Proceedings, 2004 IEEE Asia-Pacific Conference on Circuits and Systems*, vol. 1, (2004),205-208.

* cited by examiner

MULTICARRIER RECEIVER AND METHOD FOR CARRIER FREQUENCY OFFSET CORRECTION AND CHANNEL ESTIMATION FOR RECEIPT OF SIMULTANEOUS TRANSMISSIONS OVER A MULTI-USER UPLINK

CROSS REFERENCE TO RELATED APPLICATIONS

This patent application is related to U.S. patent applications Ser. Nos. 11/172,449, 11/172,451, and 11/172,452 filed concurrently herewith.

TECHNICAL FIELD

Some embodiments of the present invention pertain to multicarrier wireless communications, and some embodiments pertain to channel estimation and carrier frequency offset estimation for in multiple-input multiple-output (MIMO) receivers of wireless local area networks (WLANs).

BACKGROUND

In order to help reduce latency between communications with several transmitting stations, some multicarrier communication stations may desire to receive communications from several transmitting stations concurrently. One difficulty with concurrently receiving multiple spatial streams from different transmitting stations is that each transmitting station uses a different oscillator for generating carrier frequencies: Because the oscillators are not synchronized, each carrier frequency may have a different carrier frequency offset that should be compensated for in the receiving station. Furthermore, the channel between each transmitting station and the receiving station may also exhibit different channel characteristics which should also be taken into account by the receiving station.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
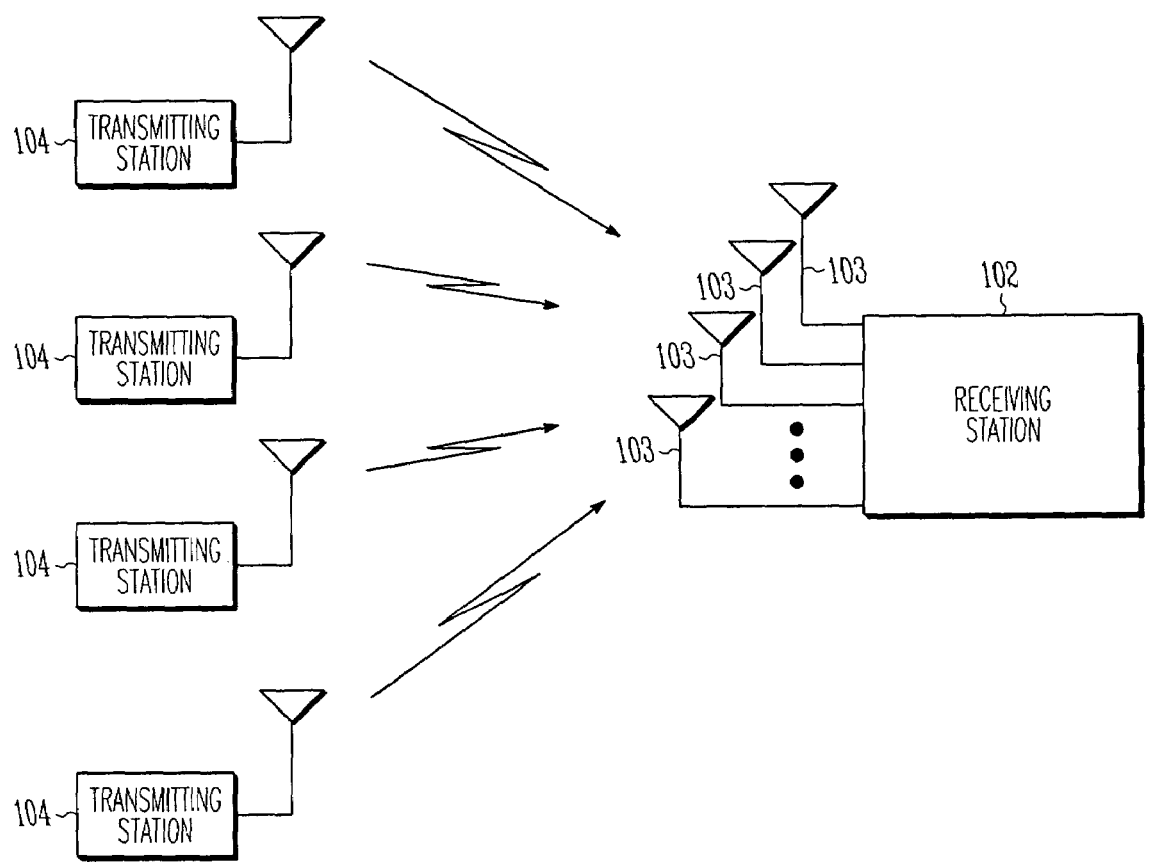
FIG. 1 illustrates a wireless communication network in accordance with some embodiments of the present invention.

FIG. 1 illustrates a wireless communication network in accordance with some embodiments of the present invention. Wireless network 100 comprises receiving station 102 and one or more of a plurality of transmitting stations 104. Receiving station 102 may provide for communications between associated transmitting stations 104 and may allow associated transmitting stations 104 to communicate with one or more external networks, such as the Internet.

In some embodiments, receiving station 102 may be a wireless access point (AP), such as a Wireless Fidelity (WiFi), Worldwide Interoperability for Microwave Access (WiMax), or broadband communication station, although the scope of the invention is not limited in this respect as receiving station 102 may be almost any communication station. In some embodiments, transmitting stations 104 may be communication stations (STAs), such as WiFi, WiMax, or broadband communication stations, although the scope of the invention is not limited in this respect.

In accordance with some embodiments of the present invention, receiving station 102 employs a multi-user uplink with more than one of associated transmitting stations 104. In these embodiments, latency may be reduced for applications operating on selected associated transmitting stations 104. The applications may include time-sensitive applications, such as voice over IP (VoIP) or streamed video applications, which may have time-sensitive packet transmission requirements. In some embodiments, the applications may include applications having quality-of-service (QOS) level requirements. Quality-of-service level requirements may include data rate requirements, error rate requirements and/or packet priority requirements. In some embodiments, the quality-of-service level requirements may be based on the information content of the communications. The applications may also include less time-sensitive applications such applications that communicate best-effort traffic as well as background traffic. Although some embodiments of the present invention are described reducing latency for time-sensitive applications, the scope of the invention is not limited in this respect, as some embodiments are equally applicable to almost any communication application operating on a transmitting station. In some embodiments, time-sensitive applications may refer to any communication application having a packet-latency requirement.

In some embodiments, power consumption of associated communications stations 104 may also be reduced. In some embodiments, receiving station 102 may substantially simultaneously receive uplink data through two or more receive antennas from two or more associated transmitting stations 104 on the same frequency subcarriers of a multicarrier communication channel. In these embodiments, receiving station 102 may internally separate the uplink data transmitted by the two or more associated transmitting stations 104 using channel estimates for each associated transmitting station from which a transmission is received. In some embodiments, receiving station 102 may take advantage of the antenna diversity resulting from differently located associated transmitting stations. These embodiments are discussed in more detail below.

In accordance with some embodiments of the present invention, receiving station 102 receives long and short frequency-interleaved orthogonal training signals that were concurrently transmitted from transmitting stations 104. The training signals are received through each receive antenna 103 of receiving station 102. Receiving station 102 generates channel estimates and carrier frequency offset (CFO) estimates for each of the transmitting stations 104 from the received training signals by performing an iterative decoding process using previously generated channel estimates and previously generated CFO estimates to cancel intercarrier interference (ICI) from the received training signals present due to loss of orthogonality induced by carrier frequency offsets. These embodiments are described in more detail below.

In some embodiments, transmitting stations 104 are polled to simultaneously respond. In some embodiments, each transmitting station 104 may use part of a standard preamble, such as an IEEE 802.11n preamble referenced below, so that transmitting stations 104 together form a virtual MIMO system. Receiving station 102 may have an equal or greater number of antennas 103 than the number of selected transmitting stations 104 to resolve the spatial streams transmitted by each transmitting station. In some of these embodiments, initial CFO estimation is performed during the receipt of a short training field (STF) and CFO correction along with channel estimation is performed during receipt of a long training field (LTF) or preamble. In some of these embodiments, each packet may include the STF, the LTF, a data field and a cyclic prefix, although the scope of the invention is not limited in this respect.

In accordance with some embodiments, $L_{cp}$ may be the cyclic prefix (CP) length, $L_h$ may be the maximum channel length and $\delta_{max}$ may be the maximum delay between the arrival of the first and last packets. The maximum delay should be less than or equal to the length of the cyclic prefix minus the maximum channel length, as illustrated by the following equation:

$$\delta_{max} \leq L_{cp} - L_h.$$

Figure 2:
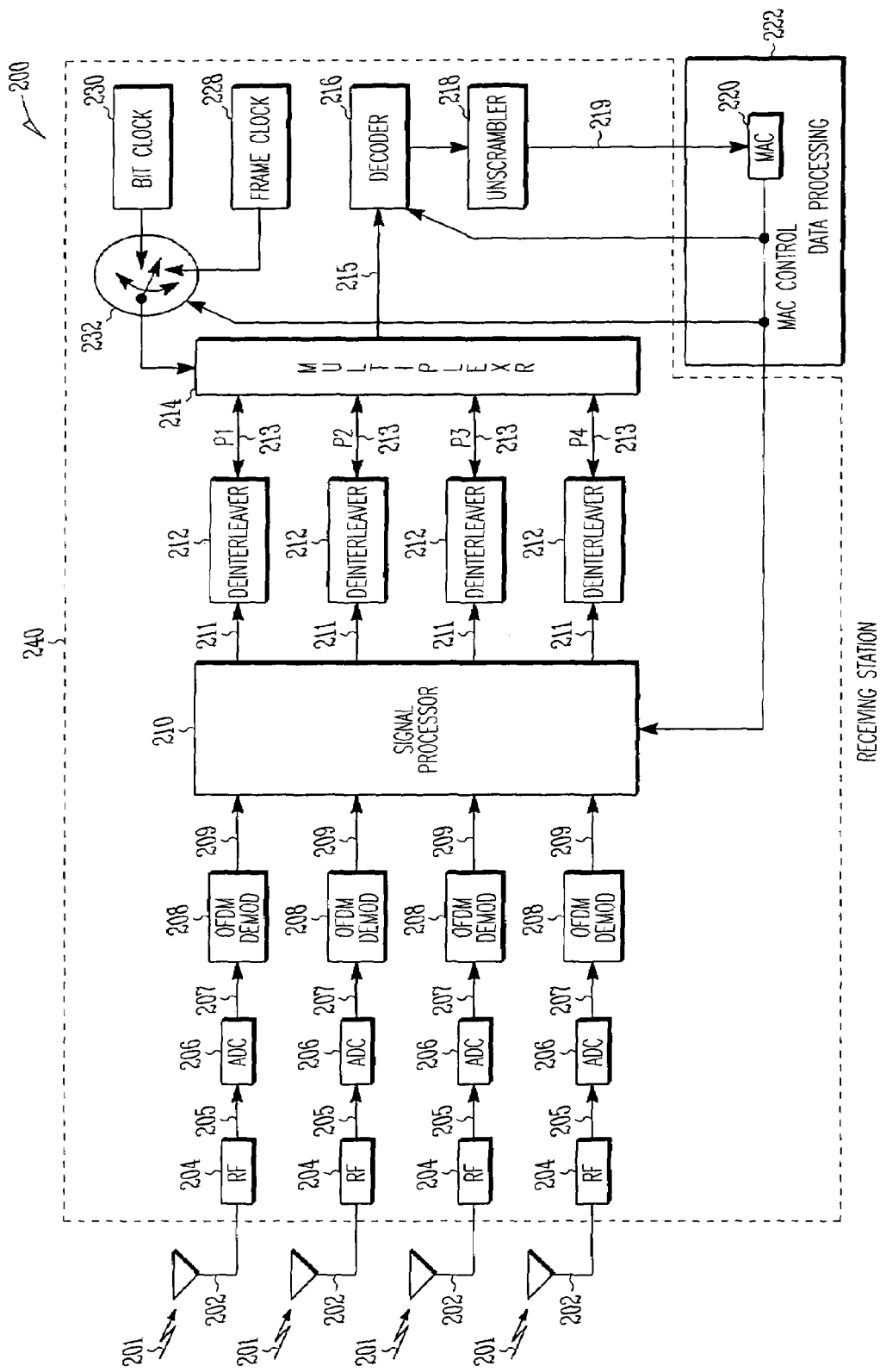
FIG. 2 is a block diagram of a receiving station in accordance with some embodiments of the present invention.

FIG. 2 is a block diagram of a receiving station in accordance with some embodiments of the present invention. Receiving station 200 may correspond to receiving station 102 (FIG. 1), although other configurations may also be suitable. Transmitting stations 104 (FIG. 1) may be similarly configured, although the scope of the invention is not limited in this respect. Receiving station 200 may receive multicarrier communication signals 201, such as orthogonal frequency division multiplexed (OFDM) signals or orthogonal frequency division multiple access (OFDMA) signals, and may generate physical (PHY) layer output data 219 for media access control (MAC) layer 220.

Receiving station 200 may comprise a plurality of receive antennas 202 to receive communications from associated transmitting stations 104 (FIG. 1), radio-frequency (RF) receiver circuitry 204 associated with each of antennas 202 to generate baseband signals 205, and analog-to-digital conversion (ADC) circuitry to generate digital signals 207 associated with each receive antenna 202. Receiving station 200 may also comprise demodulators 208 to generate demodulated signals 209. In some embodiments, demodulators 208 may comprise OFDM demodulators, although the scope of the invention is not limited in this respect.

Receiving station 200 may also comprise signal processor 210 to perform carrier frequency offset (CFO) estimation and channel estimation as discussed in more detail below. Signal processor 210 may also perform an equalization and may demap constellations to frequency-domain symbols for each subcarrier to generate a data stream 211 associated with each transmitting station 104 (FIG. 1). In some embodiments, signal processor 210 may generate channel estimates and carrier frequency offset (CFO) estimates for each of the transmitting stations 104 (FIG. 1) from the received training signals. In some embodiments, signal processor 210 may perform an iterative decoding process using previously generated channel estimates and previously generated CFO estimates to cancel intercarrier interference (ICI) from the received training signals present due to loss of orthogonality induced by carrier frequency offsets. These operations performed by signal processor 210 are described in more detail below.

Receiving station 200 may also comprise deinterleavers 212 to perform deinterleaving operations on bits 211 and multiplexer 214 to multiplex the bits from deinterleavers 212 to generate frames 215 based on boundary information provided by bit clock 230 or frame clock 228. Receiving station 200 may also comprise decoder 216 to decode frames 215, and unscrambler 218 to unscramble the decoded frames to generate PHY layer output data 219, although the scope of the invention is not limited in this respect.

Receiving station 200 includes data processing circuitry 222, which may include MAC layer 220. Data processing circuitry 222 may select a predetermined number of transmitting stations based on a number of receive antennas 202 available to receive communication signals from the transmitting stations over a multi-user uplink discussed in more detail below. In some embodiments, receiving station 200 may use up to four receive antennas 202 for receiving communication signals 201 from up to four associated transmitting stations. In some embodiments, receiving station 200 may use up to ten or more receive antennas 202 for receiving communication signals 201 from up to ten or more associated transmitting stations.

In some embodiments, receiving station 200 may transmit and/or receive OFDM or OFDMA communication signals over a multicarrier communication channel. These multicarrier communication signals may be within a predetermined frequency spectrum and may comprise a plurality of orthogonal subcarriers. In some embodiments, the orthogonal subcarriers may be closely-spaced subcarriers. To help achieve orthogonality between the closely-spaced subcarriers, each subcarrier may have a null at substantially a center frequency of the other subcarriers. In some embodiments, to help achieve orthogonality between the closely-spaced subcarriers, each subcarrier may have an integer number of cycles within a symbol period, although the scope of the invention is not limited in this respect.

In some embodiments, the frequency spectrums for the multicarrier communication signals communicated between receiving station 102 (FIG. 1) and associated transmitting stations 104 (FIG. 1) may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequencies between 2 and 11 GHz, although the scope of the invention is not limited in this respect.

In some embodiments, receiving station 102 (FIG. 1) and associated transmitting stations 104 (FIG. 1) may transmit and/or receive RF communications in accordance with specific communication standards, such as the Institute of Electrical and Electronics Engineers (IEEE) standards including IEEE 802.11(a), 802.11(b), 802.11(g), 802.11(h) and/or 802.11(n) standards for wireless local area networks (WLANs), although these stations may also be suitable to transmit and/or receive communications in accordance with other techniques, including techniques in accordance with the Task Group N (TGn) Sync (TGnSync) draft proposal for the IEEE 802.11n standard for MIMO WLAN communications. In some broadband and WiMax embodiments, receiving station 102 (FIG. 1) and associated transmitting stations 104 (FIG. 1) may communicate broadband wireless communications in accordance with the IEEE 802.16(e) standards for wireless metropolitan area networks (WMANs), although the scope of the invention is not limited in this respect. For more information with respect to IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments/versions.

In some embodiments, receiving station 102 (FIG. 1) and/or any one or more of associated transmitting stations 104 (FIG. 1) may each be part of a portable communication device, such as personal digital assistant (PDA), a laptop or portable computer with wireless communication capability, a web tablet, a wireless telephone, a wireless headset, a pager, an instant messaging device, a digital camera, a television or other device that may receive and/or transmit information wirelessly.

Antennas 202 may comprise directional or omnidirectional antennas, including, for example, dipole antennas, monopole antennas, patch antennas, loop antennas, microstrip antennas or other types of antennas suitable for reception and/or transmission of RF signals. Although receiving station 200 is illustrated in FIG. 2 as having four antennas 202 and four associated receive signal paths, the scope of the invention is not limited in this respect. In some embodiments, receiving station 200 may have as few as two receive antennas and as many as ten or more receive antennas.

In some embodiments, bit clock 230 may provide bit boundaries to the multiplexer when signal processing circuitry 210 generates data received from a single associated transmitting station 104 (FIG. 1). Switching element 232 may selectively couple either bit clock 230 or frame clock 228 with the multiplexer. Frame clock 228 may be coupled when uplink data is being received substantially simultaneously from two or more selected transmitting stations, while bit clock 230 may be coupled when uplink data is being received at different times from different transmitting stations (i.e., when communicating in a standard mode).

Although receiving station 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of receiving station 200 may refer to one or more processes operating on one or more processing elements.

Figure 3:
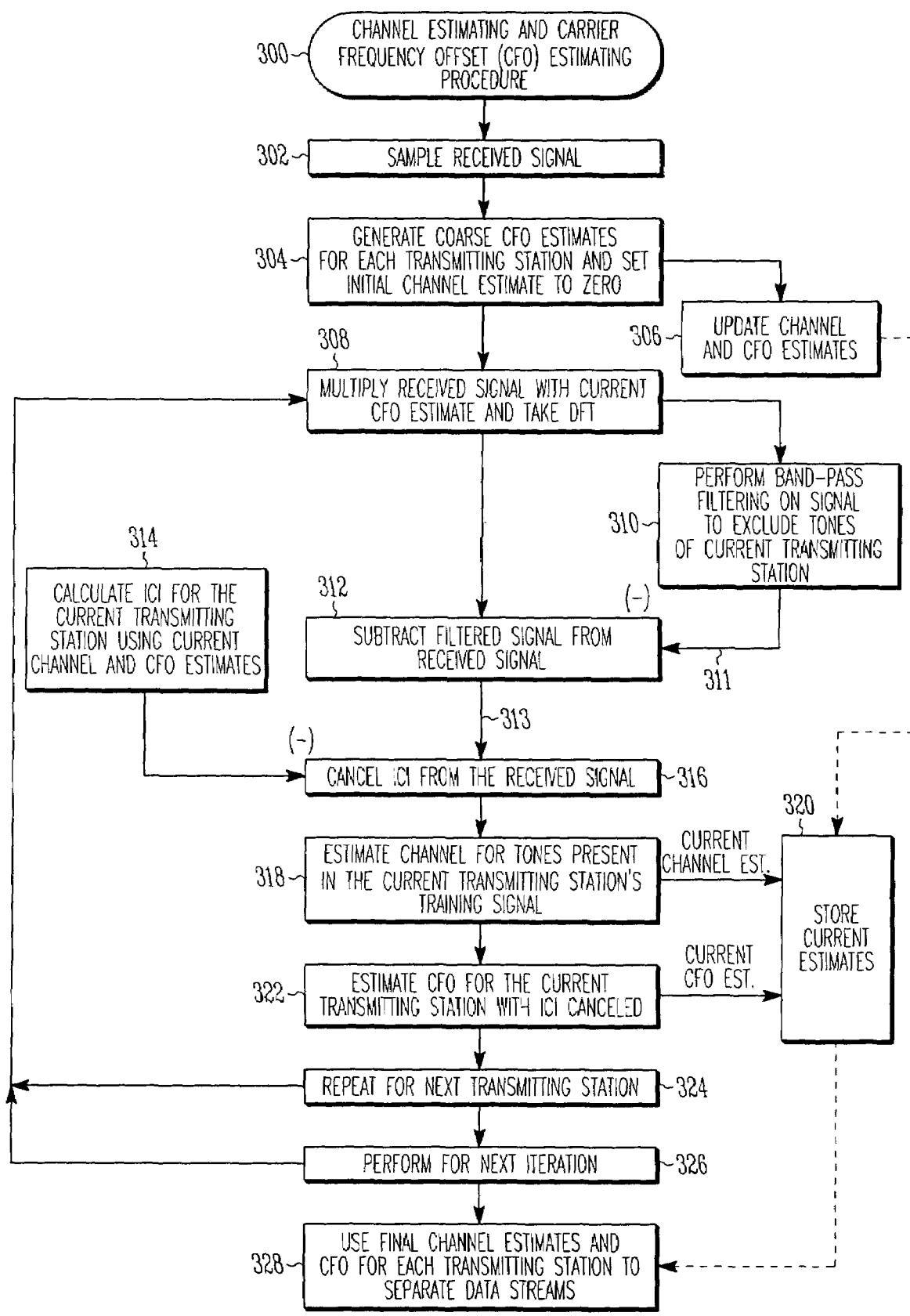
FIG. 3 is a flow chart of an iterative channel estimating and carrier frequency offset estimating procedure in accordance with some embodiments of the present invention.

FIG. 3 is a flow chart of an iterative channel estimating and carrier frequency offset estimating procedure in accordance with some embodiments of the present invention. Iterative channel estimating and carrier frequency offset estimating procedure 300 may be performed by a signal processor of a receiving station to generate carrier frequency offset estimates and channel estimates for each of a plurality of transmitting stations for use in separating data signals transmitted by the transmitting stations. In some embodiments, most operations of iterative channel estimating and carrier frequency offset estimating procedure 300 may be performed by signal processor 210 (FIG. 2) of receiving station 200 (FIG. 2), although other configurations may also be suitable for performing procedure 300. Although the individual operations of procedure 300 are illustrated and described as separate operations, one or more of the individual operations may be performed concurrently, and nothing requires that the operations be performed in the order illustrated.

Operation 302 samples the received signal and the short training signals included therein may be used to generate an initial CFO estimate for each transmitting station in operation 304. The short training signals may be unique to each transmitting station, allowing a receiving station to generate a CFO estimate for each transmitting station. The number of transmitting stations may be less than or equal to the number of antennas used by the receiving station to receive these training signals. Each transmitting station generally uses one antenna to transmit the training signals, although the scope of the invention is not limited in this respect. As part of operation 304, the channel estimates are initially set to zero, and operation 306 comprises storing the initial CFO estimates and channel estimates for each transmitting station.

Operation 308 begins the iterative process in which operations 308 through 322 are performed for each of the transmitting stations for a predetermined number of iterations. Operation 308 comprises multiplying the long-training signals of a received signal by the initial CFO estimate for the first transmitting station and taking a discrete Fourier transform (DFT).

Operation 310 comprises band-pass filtering the signal to exclude tones of the current transmitting station to generate filtered signal 311. Operation 312 comprises subtracting resultant filtered signal 311 from the received signal. Operations 310 and 312 may be performed on a set of frequency-domain samples generated by the DFT of the LTS.

Operation 314 comprises calculating the ICI for the current transmitting station using the current channel estimates and CFO estimates for the current transmitting station and operation 316 comprises subtracting the ICI from the signal generated by operation 312 to at least in part, cancel the ICI. The result of operation 316 is a frequency-domain signal from the current transmitting station with reduced ICI. During each iteration, additional ICI may be cancelled.

Operation 318 comprises estimating the channel based on the tones (i.e., subcarriers) present in the current transmitting station's training signals, which are known. Operation 320 comprises storing the updated channel estimates for subsequent use by operation 314 during the next iteration.

Operation 322 comprises estimating the CFO for the current transmitting station based on the signals generated in operation 316. Operation 320 comprises updating the CFO estimate for the current transmitting station for subsequent use by operation 314 during the next iteration.

Operation 324 comprises repeating operations 308 through 322 for the next transmitting station using the current channel estimate and CFO estimate for the next transmitting station. Upon the initial completion of operation 324, channel estimates and CFO estimates result for each transmitting station based on a first iteration.

Operation 326 repeats operations 308 through 324 for a predetermined number of iterations. In some embodiments, the number of iterations may depend on whether the CFOs are closely-spaced (e.g., CFOs ranging from −20 KHz to +20 KHz) or whether the CFOs are widely-spaced CFOs (e.g., CFOs ranging from +50 KHz to −50 KHz). More iterations may be selected for widely-spaced CFOs, although the scope of the invention is not limited in this respect.

Operation 328 comprises using the final CFO estimate and channel estimate for each transmitting station to process data signals for each transmitting station. With sufficient iterations, performance substantially equivalent to a single-input single-output (SISO) channel estimation may be obtained.

Figure 4:
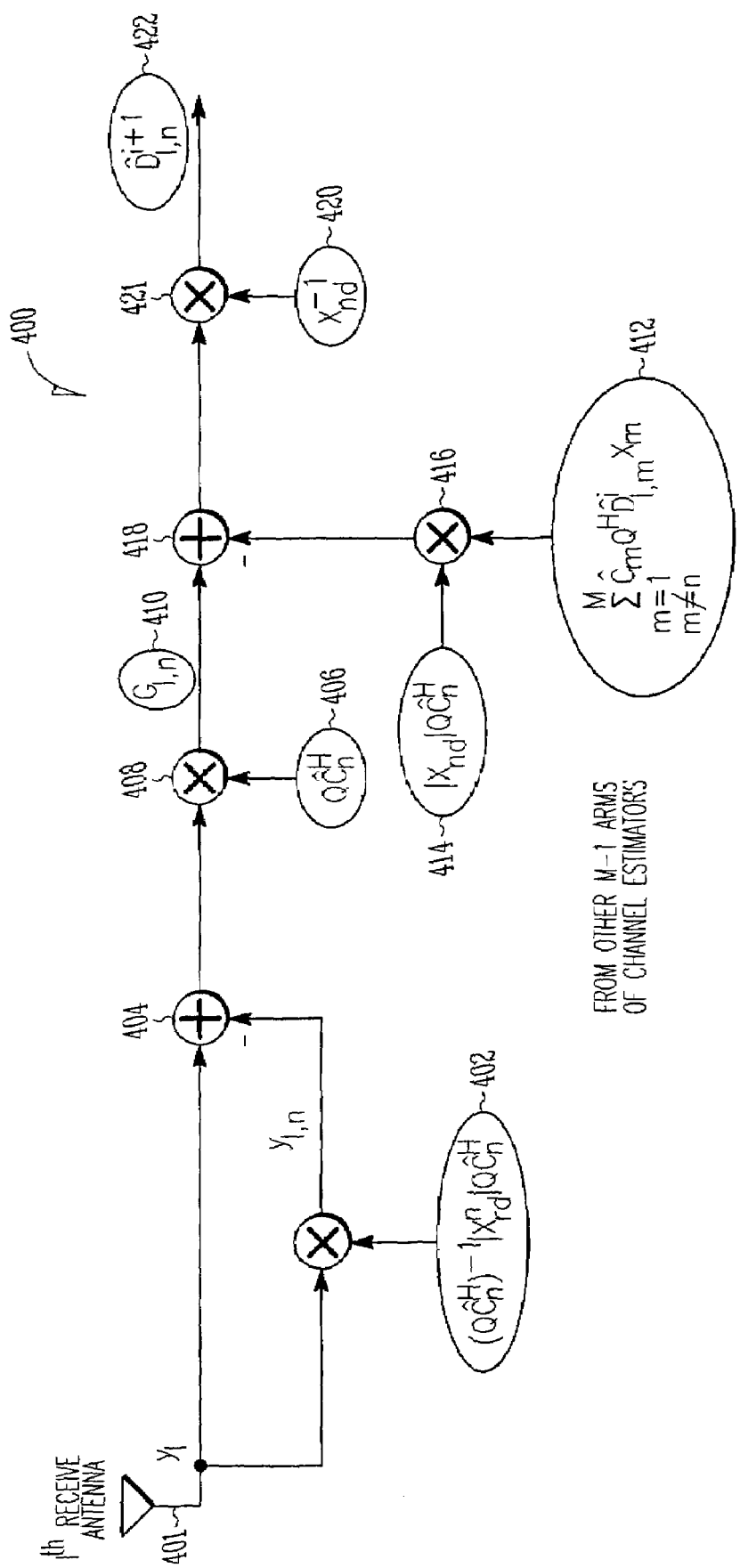
FIG. 4 illustrates the signal processing operations performed for one receive signal path in accordance with some embodiments of the present invention.

FIG. 4 illustrates the signal processing operations performed for one receive signal path in accordance with some embodiments of the present invention. Signal processing operations 400 may correspond to operations performed by signal processor 210 (FIG. 2) for baseband signals 209 (FIG. 2) received through one of RF signal paths. In this example, antenna 401 may correspond to one of antennas 201 (FIG. 2) and signal y1 may correspond to one of baseband signals 209 (FIG. 2).

In this example, mathematical expression 402 represents a band-pass filter matrix for tones excluding the tones transmitted by $n^{th}$ transmitting station and may be generated by operation 310 (FIG. 3). Operation 404 illustrates the generation of a received signal due to the $n^{th}$ transmitting station also corresponding to operation 310 (FIG. 3).

In this example, mathematical expression 406 represents CFO correction and the performance of a DFT and may correspond to operation 308 (FIG. 3). Operation 408 corresponds to operation 312 (FIG. 3).

In this example, mathematical expression 410 represents the output of the channel ($l^{th}$ receiver and $n^{th}$ transmitter) along with the ICI due to other transmitting stations and may correspond to signal 313 (FIG. 3).

In this example, mathematical expression 412 represents the estimated ICI on all the tones corresponding to operation 314 (FIG. 3).

In this example, mathematical expression 414 is a multiplying factor used to extract ICI on the signal represented by mathematical expression 410 from mathematical expression 412. Operation 416 illustrates the canceling of ICI corresponding to operation 316 (FIG. 3).

In this example, mathematical expression 420 represents the inverse of the diagonal matrix of the transmitted signal from the $n^{th}$ transmitting station. Operation 421 represents the generation of the channel estimates corresponding to operation 318 (FIG. 3). In this example, mathematical expression 422 represents the channel estimates of the channel between the $n^{th}$ transmitting station and the $l^{th}$ receiver antenna.

In an example embodiment with M transmitting stations 104 (FIG. 1), the received baseband signal y1 on one of the $l^{th}$ receive antennas of the receiving station may be represented by the following equation:

$$y_l = \sum_{m=1}^{M} C_m H_{l,m} Q^H X_m + \eta_l \quad (1)$$

In this equation, $C_m$=CFO diagonal matrix given by diag(1, $e^{j2\pi T_s \Delta f_m}$, $e^{j2\pi T_s 2\Delta f_m}$, ... $e^{j2\pi T_s (N-1)\Delta f_m}$; $\Delta f_m$ may represent the CFO of the $m^{th}$ transmitting station with respect to the receiver antenna and $T_s$ is the sampling time. In this equation, $X_m$ represents the long training signals. In some embodiments, the long training signals may correspond to the long training field (LTF) sequence (e.g., a frequency interleaved OFDM symbol) of the $m^{th}$ transmitter transmitted during a preamble, such as a physical layer convergence protocol (PLCP) preamble, although the scope of the invention is not limited in this respect. In some embodiments, $X_m^H X_p = \delta_{mp}$ where $\delta_{mp}=1$ when m=p and $\delta_{mp}=0$ when m≠p In these embodiments, $X_m$ may comprise +1, −1 and 0 as defined in the IEEE 802.11 a/n standards referenced above. In this equation, $Q^H$ may represent an inverse-discrete Fourier transform (IDFT) matrix and $(.)^H$ may denote the conjugate and transpose. In this equation, $H_{l,m}$, may be a circulant matrix representing a time domain fading channel between the $m^{th}$ transmitting station and the $l^{th}$ receiving antenna. The circulant matrix $H_{l,m}$ may alternatively be represented by diagonal matrix $D_{l,m}=QH_{l,m}Q^H$ which may comprise frequency-domain channel coefficients. $\eta_l$ may represent an additive white Gaussian noise vector at the $l^{th}$ antenna.

A diagonal matrix $$X_{rd}^n = diag\left(\frac{1}{M-1}\sum_{\substack{m=1\\m\neq n}}^{M} X_m\right)$$

may be derived from the summation of the orthogonal transmitted vectors except $X_n$. $X_{nd}=I-|X_{rd}^n|$ and $\hat{C}_n$ may be defined to be the estimated CFO for the $n^{th}$ station, and the channel coefficients $D_{l,n}$ may be estimated in accordance with signal processing operations 400. This process is an iterative decoding process in which previous estimates of the channel are used to cancel the intercarrier interference (ICI) present due to loss in orthogonality induced by CFO. FIG. 4 shows only one arm (i.e., the operations for one receive antenna), however the other channel estimates may be derived similarly.

From equation (1) above the $n^{th}$ component may be separated out as shown in equation (2) below:

$$y_l = C_n H_{l,n} Q^H X_n + \sum_{\substack{m=1\\m\neq n}}^{M} C_m H_{l,m} Q^H X_m + \eta_l \quad (2)$$

Multiplying both sides of equation (2) by $\hat{C}_n^H$ and taking the DFT may result in:

$$Q\hat{C}_n^H y_l = Q\hat{C}_n^H C_n H_{l,n} Q^H X_n + Q\hat{C}_n^H \sum_{\substack{m=1\\m\neq n}}^{M} C_m H_{l,m} Q^H X_m + Q\hat{C}_n^H \eta_l. \quad (3)$$

Assuming near perfect CFO estimation $\hat{C}_n^H C_n \approx I$; in which |.| denotes absolute value in the following equations.

$$|X_{rd}^n|Q\hat{C}_n^H y_l = |X_{rd}^n|D_{l,n}X_n + |X_{rd}^n|Q\hat{C}_n^H \sum_{\substack{m=1\\m\neq n}}^{M} C_m H_{l,m} Q^H X_m + |X_{rd}^n|Q\hat{C}_n^H \eta_l \quad (4)$$

The first term in the right hand side of the above equation may reduce to zero when $X_r$ and $X_n$ are orthogonal. Therefore equation (4) may reduce to:

$$Y_{l,n} = |X_{rd}^n| Q \hat{C}_n^H y_l \quad (5)$$

$$= |X_{rd}^n| Q \hat{C}_n^H \sum_{\substack{m=1 \\ m \neq n}}^{M} C_m H_{l,m} Q^H X_m + |X_{rd}^n| Q \hat{C}_n^H \eta_l$$

From equations (3) and (5), the following relation may be obtained:

$$G_{l,n} = Q \hat{C}_n^H y_l - Y_{l,n} \quad (6)$$

$$= D_{l,n} X_n + (1 - |X_{rd}^n|) Q \hat{C}_n^H \sum_{\substack{m=1 \\ m \neq n}}^{M} C_m H_{l,m} Q^H X_m +$$

$$(1 - |X_{rd}^n|) Q \hat{C}_n^H \eta_l$$

The diagonal matrix $D_{l,n}$ may provide the frequency-domain channel coefficients corresponding to non-zero tones of the $n^{th}$ station's training signals. The second term in equation (6) may represent the ICI due to CFO. Frequency-domain channel estimates for the spatial channel corresponding to the $n^{th}$ station and the $l^{th}$ receiving antenna of receiving station may be estimated as follows:

$$\mathrm{diag}(\hat{D}_{l,n}) = \mathrm{diag}(X_n)^{-1} G_{l,n} \quad (7)$$

$\mathrm{diag}(\hat{D}_{l,n})$ is a vector and $\hat{D}_{l,n}$ is the diagonal matrix. The estimate of equation (7) may be further improved through an iterative process described by equation (8) where $\hat{C}_m$ and $\hat{D}_{l,n}^i$ are known through estimation as described above and i is the iteration number.

$$\mathrm{diag}(\hat{D}_{l,n}^{i+1}) = \mathrm{diag}(X_n)^{-1} \times \left( G_{l,n} - |X_{rd}| Q \hat{C}_n^H \sum_{\substack{m=1 \\ m \neq n}}^{M} \hat{C}_m Q^H \hat{D}_{l,m}^i X_m \right) \quad (8)$$

Matrix $\mathrm{diag}(X_n)$ is a rank-deficient diagonal matrix since it has only a subset (i.e. K/M interleaved tones) of non-zero terms. The zeros are of little concern because those rows don't contribute to $\hat{D}_{l,n}$ so only non-zero terms are inverted while determining the inverse of $\mathrm{diag}(X_n)$ In some example embodiments which use four transmitting stations and one receiving station, such as an IEEE 802.11n access point, each transmitting station may use a single antenna for transmitting uplink signals; and the preamble portion may comprise a sequence of frequency interleaved orthogonal tones in the form of an LTF. The preambles of the transmitting stations are combined together in the channel to form a high throughput (HT)-WLAN preamble, such as the preamble defined in the Task Group N (TGn) Sync (TGn-Sync) draft proposal for the IEEE 802.11n standard for MIMO WLAN network communications.

Figure 5A:
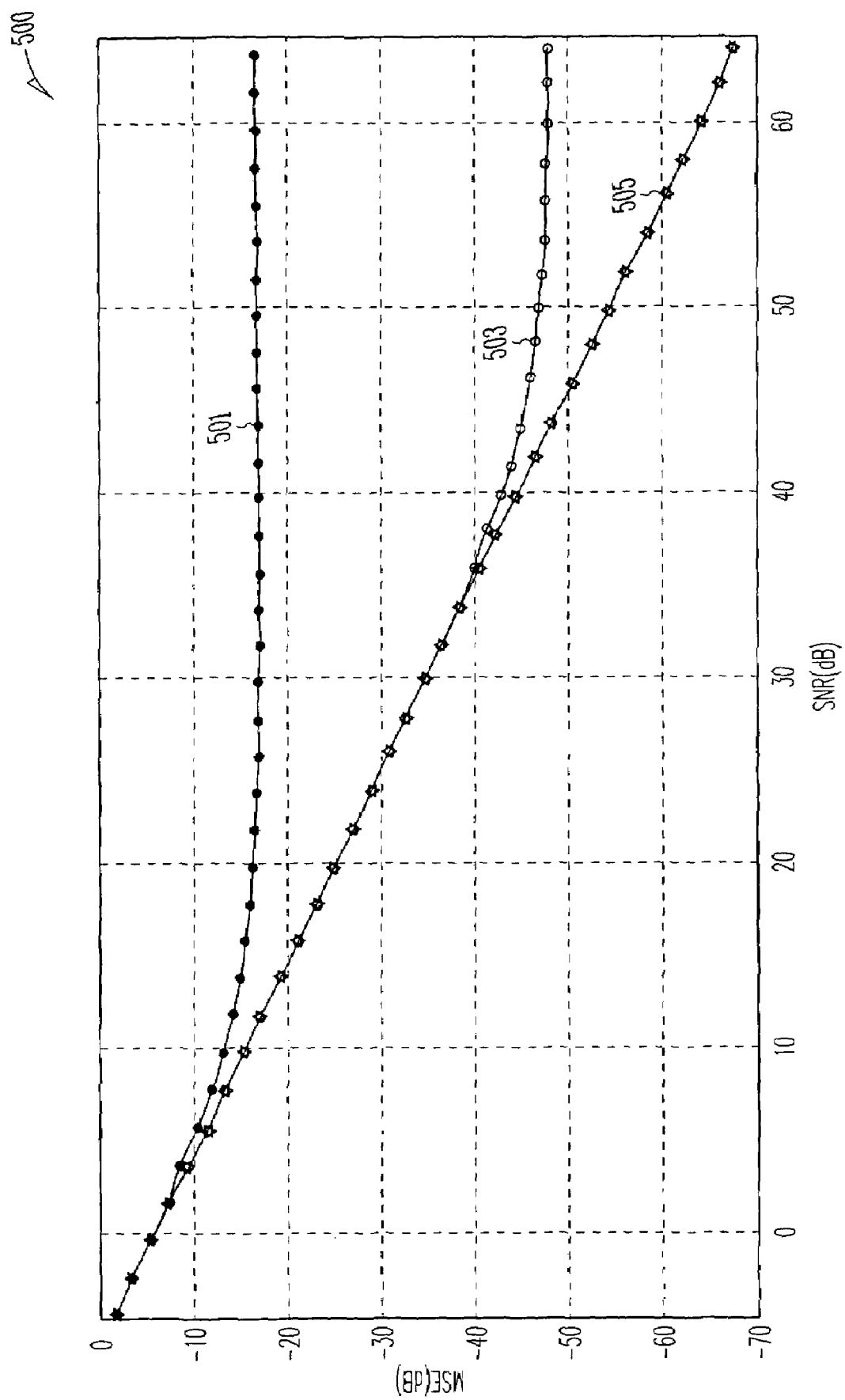
FIGS. 5A and 5B illustrate simulation results of the mean square error (MSE) of the channel estimate against the signal-to-noise ratio (SNR) for different carrier frequency offsets in accordance with some embodiments of the present invention.
Figure 5B:
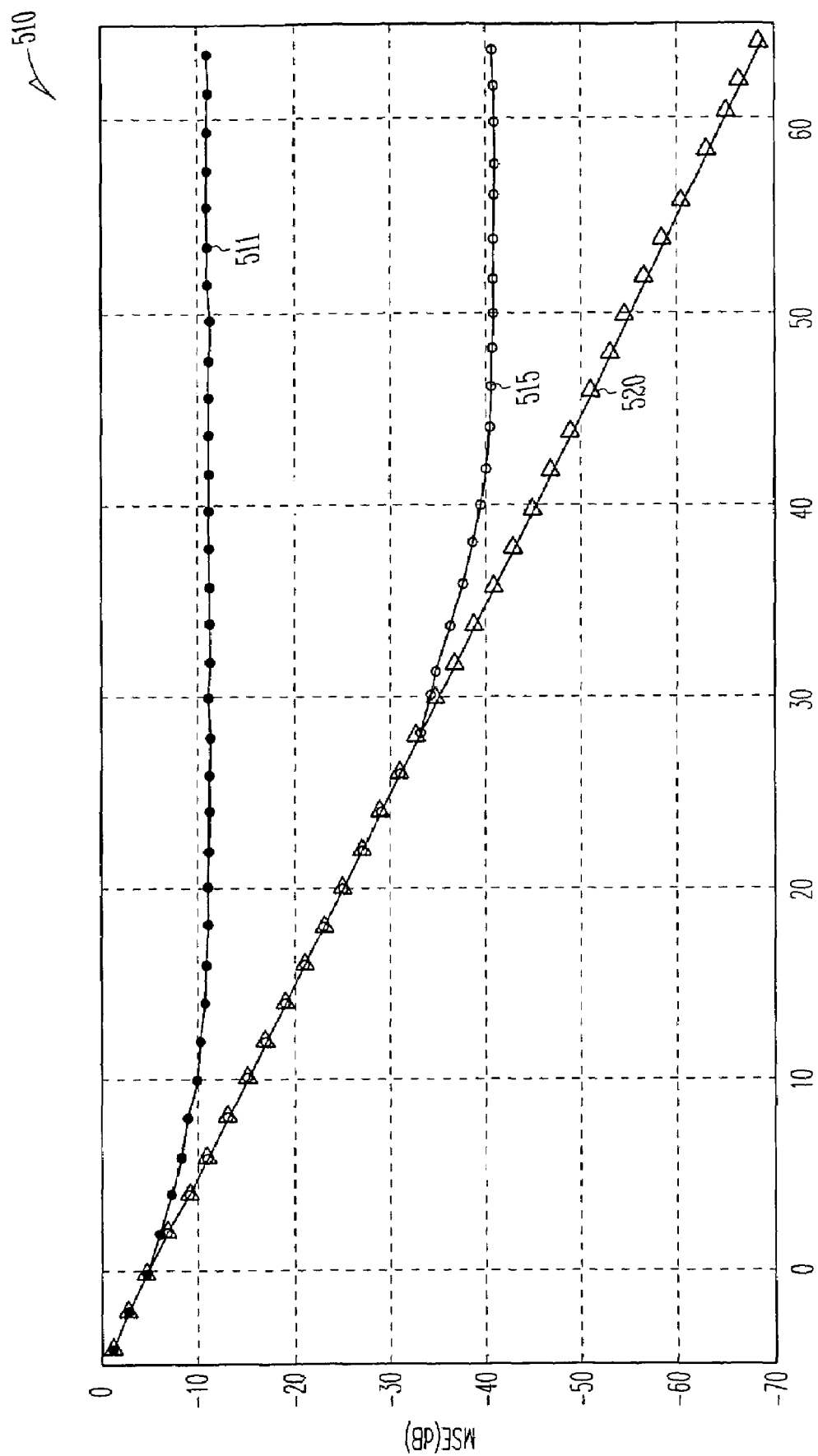

FIGS. 5A and 5B illustrate simulation results of the mean square error (MSE) of the channel estimate against the signal-to-noise ratio (SNR) for different carrier frequency offsets in accordance with some embodiments of the present invention. FIG. 5A shows the channel estimation results 500 for closely-spaced CFOs (e.g., CFOs ranging from −20 KHz to +20 KHz). FIG. 5B shows the channel estimate results 510 for widely-spaced CFOs (e.g., CFOs ranging from +50 KHz to −50 KHz). In FIG. 5A, channel estimation results for one iteration are illustrated by plot 501, channel estimation results for three iterations are illustrated by plot 503, and channel estimation results for five iterations are illustrated by plot 505. In FIG. 5B, channel estimation results for one iteration are illustrated by plot 511, channel estimation results for five iterations are illustrated by plot 515, and channel estimation results for ten iterations are illustrated by plot 520.

In the simulation results illustrated in FIGS. 5A and 5B, the total delay may correspond to (i) packets arrival delays at the receiving station due to different distances of the transmitting station from the receiving station, (ii) PHY-MAC interface delay of each transmitting station, and (iii) the channel spread. The total delay is assumed to be equal or less than the cyclic prefix of an OFDM symbol. FIGS. 5A and 5B illustrate results for a channel delay of 50 ns, which is sometimes found in an office WLAN environment. As illustrated in FIG. 5A, for closely-spaced CFOs, performance substantially equivalent to a single-input single-output (SISO) channel estimation may be obtained within five iterations. As illustrated in FIG. 5B, for widely-spaced CFOs additional iterations (up to ten, for example) may be required to achieve similar performance illustrated in FIG. 5A.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Some embodiments may be implemented in a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features may be occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A multicarrier receiver comprising:
  a plurality of receive-signal paths to receive and separately demodulate training signals that were concurrently transmitted from a plurality of transmitting stations; and
  signal processor to generate channel estimates and carrier frequency offset estimates for each of the transmitting stations from the separately demodulated training signals and to perform an iterative decoding process using previously generated channel estimates and previously generated carrier frequency offset estimates to cancel intercarrier interference from the received training signals induced by carrier frequency offsets, wherein for each transmitting station of the plurality of transmitting stations, the iterative decoding process includes removal of portions of the received training signals transmitted by transmitting stations other than a current transmitting station of the plurality to generate the carrier frequency offset for the current transmitting station.

2. The receiver of claim 1 wherein the training signals are frequency interleaved among a plurality of subcarriers of a multicarrier communication channel, wherein the training signals transmitted by each of the transmitting stations are substantially orthogonal to each other, and wherein the training signals are followed by non-orthogonal data signals transmitted concurrently by each of the transmitting stations on the same frequency subcarriers of the multicarrier communication channel.

3. The receiver of claim 2 wherein the signal processor generates separate data streams for each transmitting station using a final channel estimate and a final carrier frequency offset for each transmitting station, and wherein the separate data streams for each transmitting station are generated from the non-orthogonal data signals.

4. The receiver of claim 1, wherein each receive-signal path is associated with a receive antenna, wherein each receive-signal path includes an OFDM demodulator to provide demodulated signals received through the associated receive antenna, and wherein a number of the receive antennas is greater than or equal to a number of the transmitting stations, the signal processor to take advantage of antenna diversity to distinguish between signals from the transmitting stations.

5. The receiver of claim 1 wherein for each of the transmitting stations, the signal processor regenerates the channel estimates and carrier frequency offset estimate for said each transmitting station using the previously generated channel estimates and the previously generated carrier frequency offset estimates for reprocessing samples of the received signals.

6. A multicarrier receiver comprising:

a plurality of receive-signal paths to receive training signals concurrently transmitted from a plurality of transmitting stations; and signal processor to generate channel estimates and carrier frequency offset estimates for each of the transmitting stations from the received training signals and to perform an iterative decoding process using previously generated channel estimates and previously generated carrier frequency offset estimates to cancel intercarrier interference from the received training signals induced by carrier frequency offsets, wherein for each of the transmitting stations, the signal processor regenerates the channel estimates and carrier frequency offset estimate for said each transmitting station using the previously generated channel estimates and the previously generated carrier frequency offset estimates for reprocessing samples of the received signals, and wherein as part of the regeneration of the carrier frequency offset and channel estimates for each transmitting station, the iterative decoding process is performed by the signal processor for each transmitting station, wherein the signal processor is adapted to:

shift the received signal by a current carrier frequency offset estimate for a current transmitting station;

remove portions of the received signal due to transmitting stations other than the current transmitting station;

calculate the intercarrier interference for the current transmitting station using the current channel estimate and the current carrier frequency offset estimate for the current transmitting station;

subtract the intercarrier interference from the received signal to generate a final processed signal; and regenerate the channel estimates and the carrier frequency offset estimate for the current transmitting station from the final processed signal.

7. The receiver of claim 6 wherein the signal processor repeats the iterative process a predetermined number of times based on a spacing between the carrier frequency offset estimates to generate a final channel estimate and a final carrier frequency offset estimate for each transmitting station, and wherein the final channel estimate and the final carrier frequency offset estimate are used by the signal processor to generate separate data streams associated with each transmitting station.

8. The receiver of claim 6 wherein, after the signal processor shifts the received signal by the current carrier frequency offset estimate, the signal processor multiplies the received signal by the current carrier frequency offset estimate for the current transmitting station, wherein as part of the iterative process, the signal processor performs a discrete Fourier transform after the received signal is multiplied by the current carrier frequency offset estimate to generate a set of frequency-domain samples, and wherein additional intercarrier interference is cancelled from the set of frequency-domain samples for each iteration.

9. The receiver of claim 6 wherein after the signal processor selectively removes portions of the received signal due to transmitting stations other than the current transmitting station, the signal processor performs a band-pass filtering operation on the received signals to at least in part remove tones of the received training signals except those tones known to be transmitted by the current transmitting station.

10. The receiver of claim 9 wherein the training signals transmitted by the transmitting stations comprise frequency-interleaved orthogonal subcarriers which unique to each transmitting station, and wherein the signal processor selectively filters out portions of the received training signal that were not transmitted by the current transmitting station.

11. The receiver of claim 1 wherein the iterative decoding process performed by the signal processor uses long-training signals transmitted by the transmitting stations, wherein the transmitting stations transmit short-training signals prior to transmitting the long-training signals, and wherein the signal processor initially generates a coarse carrier frequency offset estimate for each of the transmitting stations based on the received short-training signals, the coarse carrier frequency offset estimates being used as initial carrier frequency offset estimates for the iterative decoding process.

12. The receiver of claim 3 wherein the training signals and the data signals transmitted by the transmitting stations comprise one of either orthogonal frequency division multiplexed signals or orthogonal frequency division multiple access signals, and
   wherein the receiver transmits a downlink frame for receipt by the plurality of transmitting station to instruct the transmitting stations which frequency interleaved subcarriers to use for transmitting the training signals and which subcarriers of the multicarrier communication channel to use for transmitting the data signals.

13. A method comprising:
separately demodulating training signals received through a plurality of receive-signal paths, the training signals having been transmitted by a plurality of transmitting stations; and
generating channel estimates and carrier frequency offset estimates for each of the transmitting stations from the separately demodulated training signals by performing an iterative decoding process using previously generated channel estimates and previously generated carrier frequency offset estimates to cancel intercarrier interference from the received training signals induced by carrier frequency offsets,
wherein for each transmitting station of the plurality of transmitting stations, the iterative decoding process includes removing portions of the received training signals transmitted by transmitting stations other than a current transmitting station of the plurality to generate the carrier frequency offset for the current transmitting station.

14. The method of claim 13 wherein the training signals are frequency interleaved among a plurality of subcarriers of a multicarrier communication channel,
   wherein the training signals transmitted by each of the transmitting stations are substantially orthogonal to each other, and
   wherein the training signals are followed by non-orthogonal data signals transmitted concurrently by each of the transmitting stations on the same frequency subcarriers of the multicarrier communication channel.

15. The method of claim 14 further comprising generating separate data streams for each transmitting station using a final channel estimate and a final carrier frequency offset for each transmitting station, and
   wherein the separate data streams for each transmitting station are generated from the non-orthogonal data signals.

16. The method of claim 13 wherein each receive-signal path is associated with a receive antenna, and
   wherein a number of the receive antennas is greater than or equal to a number of the transmitting stations.

17. The method of claim 13 wherein for each of the transmitting stations, the method comprises iteratively regenerating the channel estimate and carrier frequency offset estimate for said each transmitting station using the previously generated channel estimates and the previously generated carrier frequency offset estimates for samples of the received signals.

18. A method comprising:
receiving training signals from a plurality of transmitting stations through a plurality of receive-signal paths; and
generating channel estimates and carrier frequency offset estimates for each of the transmitting stations from the received training signals by performing an iterative decoding process using previously generated channel estimates and previously generated carrier frequency offset estimates to cancel intercarrier interference from the received training signals induced by carrier frequency offsets,
   wherein for each of the transmitting stations, the method comprises iteratively regenerating the channel estimate and carrier frequency offset estimate for said each transmitting station using the previously generated channel estimates and the previously generated carrier frequency offset estimates for samples of the received signals, and
   wherein the iteratively regenerating comprises:
   shifting the received signal by a current carrier frequency offset estimate for a current transmitting station;
   removing portions of the received signal due to transmitting stations other than the current transmitting station;
   calculating intercarrier interference for the current transmitting station using the current channel estimate and the current carrier frequency offset estimate for the current transmitting station;
   subtracting the intercarrier interference from the received signal to generate a final processed signal; and
   regenerating the channel estimates and the carrier frequency offset estimate for the current transmitting station from the final processed signal.

19. The method of claim 18 further comprising repeating the iteratively regenerating a predetermined number of times based on a spacing between the carrier frequency offset estimates to generate a final channel estimate and a final carrier frequency offset estimate for each transmitting station; and
   using the final channel estimate and the final carrier frequency offset estimate to generate separate data streams associated with each transmitting station.

20. The method of claim 18 further comprising performing a discrete Fourier transform after the received signal is multiplied by the current carrier frequency offset estimate to generate a set of frequency-domain samples, wherein additional intercarrier interference is cancelled from the set of frequency-domain samples for each iteration.

21. The method of claim 18 further comprising performing a band-pass filtering operation on the received signals to at least in part remove tones of the received training signals except those tones known to be transmitted by the current transmitting station.

22. The method of claim 21 wherein the training signals transmitted by the transmitting stations comprise frequency-interleaved orthogonal subcarriers which are unique to each transmitting station, and
   wherein portions of the received training signal that were not transmitted by the current transmitting station are selectively filtered out.

23. The method of claim 13 wherein the iterative decoding uses long-training signals transmitted by the transmitting stations,
   wherein the transmitting stations transmit short-training signals prior to transmitting the long-training signals, and
   wherein the method further comprises initially generating a coarse carrier frequency offset estimate for each of the transmitting stations based on the received short-training signals, the coarse carrier frequency offset estimates being used as initial carrier frequency offset estimates for the iterative decoding process.

24. The method of claim 15 wherein the training signals and the data signals transmitted by the transmitting stations comprise one of either orthogonal frequency division multiplexed signals or orthogonal frequency division multiple access signals, and
   wherein the method further comprises transmitting a downlink frame for receipt by the plurality of transmitting station to instruct the transmitting stations which frequency interleaved subcarriers to use for transmitting the training signals and which subcarriers of the multicarrier communication channel to use for transmitting the data signals.

25. A receiver system comprising:
a plurality of onmidirectional receive antennas; and
a multicarrier receiver comprising a plurality of receive-signal paths to receive and separately demodulate training signals that were concurrently transmitted from a plurality of transmitting stations, and a signal processor to generate channel estimates and carrier frequency offset estimates for each of the transmitting stations from the separately demodulated training signals,
wherein each receive-signal path is associated with one of the receive antennas, and
wherein the signal processor performs an iterative decoding process using previously generated channel estimates and previously generated carrier frequency offset estimates to cancel intercarrier interference from the received training signals induced by carrier frequency offsets,
wherein for each transmitting station of the plurality of transmitting stations, the iterative decoding process includes removal of portions of the received training signals transmitted by transmitting stations other than a current transmitting station of the plurality to generate the carrier frequency offset for the current transmitting station.

26. The system of claim 25 wherein the training signals are frequency interleaved among a plurality of subcarriers of a multicarrier communication channel,
wherein the training signals transmitted by each of the transmitting stations are substantially orthogonal to each other, and
wherein the training signals are followed by non-orthogonal data signals transmitted concurrently by each of the transmitting stations on the same frequency subcarriers of the multicarrier communication channel.

27. A receiver system comprising:
a plurality of onmidirectional receive antennas, and
a multicarrier receiver comprising a plurality of receive-signal paths to receive training signals concurrently transmitted from a plurality of transmitting stations, and a signal processor to generate channel estimates and carrier frequency offset estimates for each of the transmitting stations from the received training signals,
wherein each receive-signal path is associated with one of the receive antennas, and
wherein the signal processor performs an iterative decoding process using previously generated channel estimates and previously generated carrier frequency offset estimates to cancel intercarrier interference from the received training signals induced by carrier frequency offsets,
wherein the training signals are frequency interleaved among a plurality of subcarriers of a multicarrier communication channel,
wherein the training signals transmitted by each of the transmitting stations are substantially orthogonal to each other,
wherein the training signals are followed by non-orthogonal data signals transmitted concurrently by each of the transmitting stations on the same frequency subcarriers of the multicarrier communication channel,
wherein for each of the transmitting stations, the signal processor to regenerate the channel estimates and carrier frequency offset estimate for said each transmitting station using the previously generated channel estimates and the previously generated carrier frequency offset estimates for reprocessing samples of the received signals,
wherein as part of the regeneration of the carrier frequency offset and channel estimates for each transmitting station, the iterative decoding process is performed by the signal processor for each transmitting station, and
wherein the signal processor is adapted to:
shift the received signal by a current carrier frequency offset estimate for a current transmitting station;
remove portions of the received signal due to transmitting stations other than the current transmitting station;
calculate the intercarrier interference for the current transmitting station using the current channel estimate and the current carrier frequency offset estimate for the current transmitting station;
subtract the intercarrier interference from the received signal to generate a final processed signal; and
regenerate the channel estimates and the carrier frequency offset estimate for the current transmitting station from the final processed signal.

28. A computer-readable medium that stores provides instructions for execution by one or more processors to perform operations comprising:
separately demodulating training signals received through each of a plurality of receive antennas, the training signals being transmitting by a plurality of transmitting stations; and
generating channel estimates and carrier frequency offset estimates for each of the transmitting stations from the separately demodulated training signals by performing an iterative decoding process using previously generated channel estimates and previously generated carrier frequency offset estimates to cancel intercarrier interference from the received training signals induced by carrier frequency offsets,
wherein for each transmitting station of the of the plurality of transmitting stations, iterative decoding process includes removal of portions of the received training signals transmitted by transmitting stations other than a current transmitting station of the plurality to generate the carrier frequency offset for the current transmitting station.

29. The computer-readable medium of claim 28 wherein the training signals are frequency interleaved among a plurality of subcarriers of a multicarrier communication channel,
wherein the training signals transmitted by each of the transmitting stations are substantially orthogonal to each other, and
wherein the training signals are followed by non-orthogonal data signals transmitted concurrently by each of the transmitting stations on the same frequency subcarriers of the multicarrier communication channel.

30. A computer-readable medium that stores provides instructions for execution by one or more processors to perform operations comprising:
processing training signals from a plurality of transmitting stations through a plurality of receive antennas;
generating channel estimates and carrier frequency offset estimates for each of the transmitting stations from the received training signals by performing an iterative decoding process using previously generated channel estimates and previously generated carrier frequency offset estimates to cancel intercarrier interference from the received training signals induced by carrier frequency offsets; and iteratively regenerating the channel estimate and carrier frequency offset estimate for said each transmitting station using the previously generated channel estimates and the previously generated carrier frequency offset estimates for samples of the received signals, wherein iteratively regenerating comprises:

shifting the received signal by a current carrier frequency offset estimate for a current transmitting station;

removing portions of the received signal due to transmitting stations other than the current transmitting station;

calculating intercarrier interference for the current transmitting station using the current channel estimate and the current carrier frequency offset estimate for the current transmitting station;

subtracting the intercarrier interference from the received signal to generate a final processed signal; and regenerating the channel estimates and the carrier frequency offset estimate for the current transmitting station from the final processed signal.

* * * * *

UNITED STATES PATENT AND TRADEMARK OFFICE
CERTIFICATE OF CORRECTION

PATENT NO. : 7,480,497 B2  Page 1 of 1
APPLICATION NO. : 11/171643
DATED : January 20, 2009
INVENTOR(S) : Biswas et al.

It is certified that error appears in the above-identified patent and that said Letters Patent is hereby corrected as shown below:

In column 15, line 5, in Claim 25, delete "onmidirectional" and insert -- omnidirectional --, therefor.

In column 15, line 39, in Claim 27, delete "onmidirectional" and insert -- omnidirectional --, therefor.

In column 15, line 39, in Claim 27, delete "antennas, and" and insert -- antennas; and --, therefor.

In column 16, line 39, in Claim 28, delete "stations, iterative" and insert -- stations, the iterative --, therefor.

Signed and Sealed this

Twenty-fourth Day of March, 2009

JOHN DOLL
*Acting Director of the United States Patent and Trademark Office*